United States Patent Office 2,921,004
Patented Jan. 12, 1960

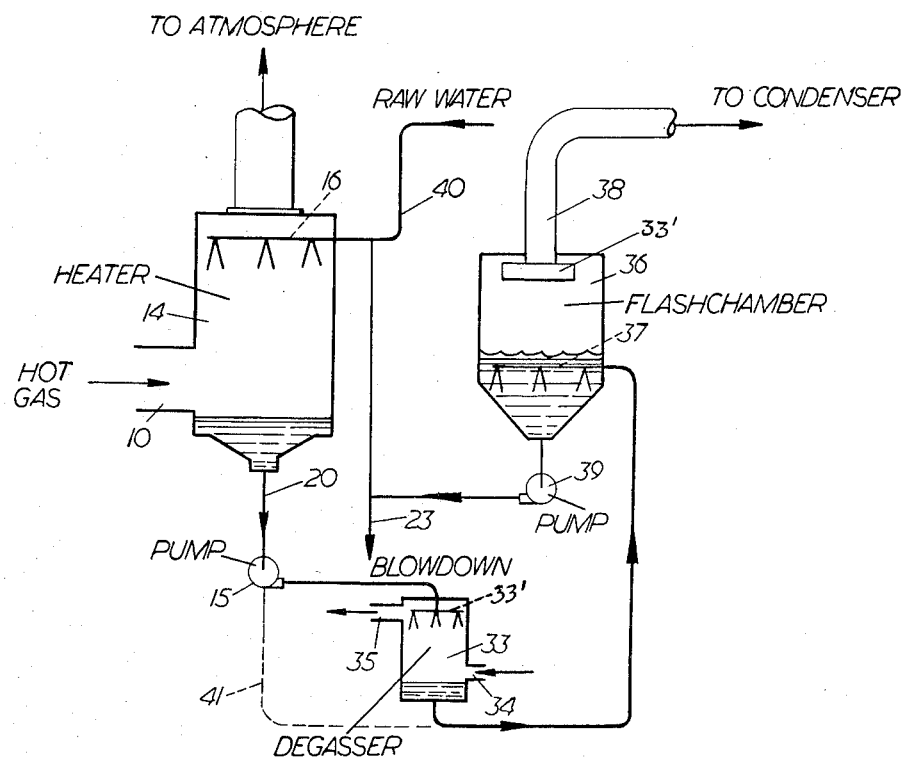

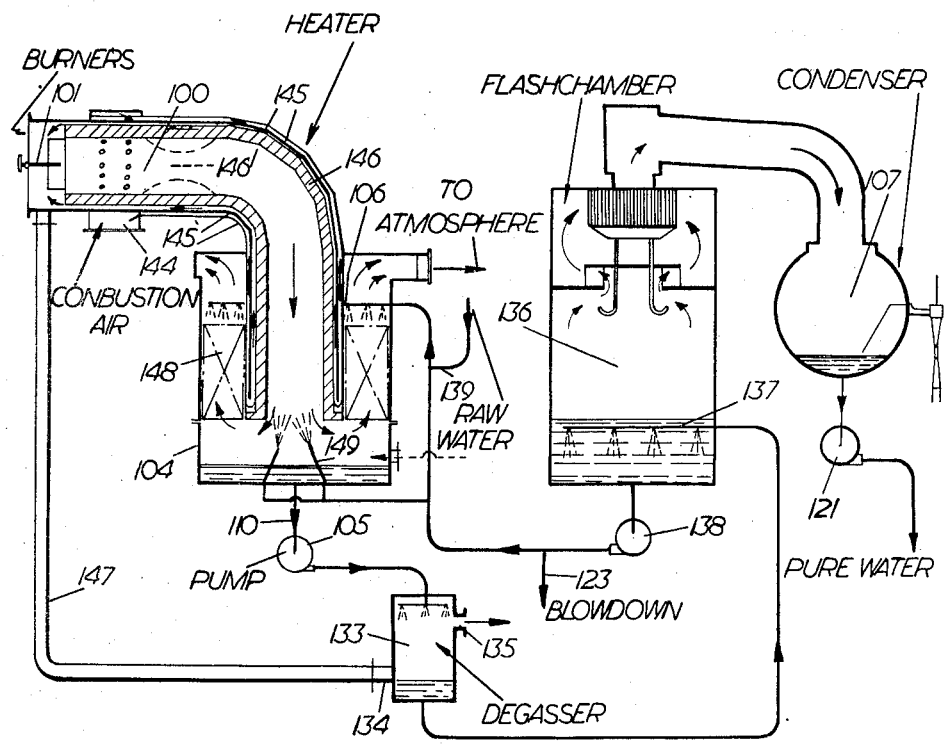

2,921,004

APPARATUS FOR THE EVAPORATION OR DISTILLATION OF WATER

Leo Kellett Donaldson Wood, London, England, assignor to Foster Wheeler Limited, London, England Application December 18, 1953, Serial No. 399,125

Claims priority, application Great Britain December 23, 1952

4 Claims. (Cl. 202—177)

This invention relates to a method and apparatus for purifying sea or other "raw" water to provide water for drinking, or feed water for steam generating plants and other purposes for which such raw water is unsuitable.

Most conventional plants for the purification of raw water for such purposes involve the indirect heating of the raw water in some form of heat exchanger by the use of high pressure or low pressure steam or by the use of hot gases. A serious difficulty then arises with scale formation which reduces the efficiency and output of the plant and leads to frequent shutting down of the plant for the cleaning of the heating surfaces. By chemical dosing of the raw water, scale formation can be eliminated to some extent, and that expedient is commonly practiced but is by no means a complete or even satisfactory solution of the problem.

A heater for purifying sea or other "raw" water in accordance with the invention comprises a casing, a gas duct within said casing having an open lower end and extending downwardly into said casing from the upper portion of said casing to a point short of the bottom thereof, said casing surrounding said duct in space relation to form a passage therebetween, means for supplying a hot gas to the top of said duct to pass downwardly therethrough and out of said open lower end, a first spray head arranged to spray "raw" water upwardly into direct heat exchange contact with the hot gases issuing from the open lower end of said duct, and a second spray head positioned above the open lower end of said duct and in the passage surrounding said duct to spray "raw" water downwardly of said passage countercurrent to the direction of flow of the hot gas issuing from said open lower end of said duct and which has been cooled by direct heat exchange contact with the upper sprayed "raw" water issuing from said first spray head.

As the raw water is heated by direct contact with the heating gas, the difficulties which arise from scale formation are eliminated. The raw water can, if desired, be chemically dosed but, generally, that will be quite unnecessary.

The gas used for heating the raw water can be produced specially or it can be derived from a source of waste heat. The combustible products of the common liquid and solid fuels are suitable. Air or steam may also be used for the direct heating or evaporating of the raw water and may be brought to the required temperature for that purpose by being heated indirectly by means of combustion products.

Where the heating gas contains water-soluble constituents, the purified water obtained after condensation may require further treatment for the elimination of such constituents. For example, if the heating gas is the product of combustion of a hydrocarbon oil, the purified water may contain excessive amounts of carbon dioxide and sulphur compounds. In that case, the carbon dioxide content can be lowered to an acceptable level simply by allowing the water to stand or by aerating it by agitation or blowing air through it. An excessive sulphur content can be dealt with by treatment of the condensate with an alkali such as lime, sodium hydroxide or sodium carbonate. Should the condensate contain free sulphurous acid, the addition of sodium carbonate will lead to the formation of sodium sulphite and can then be converted into sodium sulphate. Alternatively, the excessive acidity can be lowered by treatment of the condensate in an ion exchange plant.

The plant in which the raw water is purified may form an independent unit or it can be part of a boiler installation. In the latter case, the heating gas, or the gas used for bringing the heating gas to the required temperature, may be drawn from the furnace or the flue of the boiler and, by thus utilising heat which would otherwise be wasted or used less productively, contribute to the attainment of a high thermal efficiency.

Provision can be made for the removal of impurities which are absorbed by the raw water from the heating gas, before the raw water is subjected to evaporation. To this end, the heated raw water may be passed through a de-gassing chamber on its way from the heater to the evaporator. The main impurities which come into question are carbon dioxide and sulphur dioxide, both of which can be satisfactorily dealt with by passing air through the de-gassing chamber countercurrent to a spray of heated raw water. The carbon dioxide is thereby driven off while the sulfur dioxide is converted to sulfur trioxide which is dissolved by the water to form sulphuric acid which is not flashed off in the evaporator.

It will be appreciated that the term "purified" is not used herein necessarily to indicate that the water has been made completely pure but only that the water produced by the method of the invention has had certain undesirable constituents removed from it and, in particular, in the case in which the raw water is sea water, the salt has been removed from it.

An example of a plant which can be used for the purification of raw water by the method of the invention will now be described with reference to the accompanying diagrammatic drawings, in which:

Figure 1 shows the principle of the plant in which the raw water is heated to below the vaporizing temperature and then flashed off; and Figure 2 shows the plant, and particularly the heater, in greater detail, partly diagrammatically and partly in section.

In the description of the drawings, it will be assumed that the raw water is sea water.

Figure 1 shows in a simplified diagrammatic manner, a plant in which, in accordance with the invention the sea water is heated to below its vaporization temperature and is passed to a zone of reduced pressure in which it is subjected to flash evaporation.

The heating gas is led from a combustion chamber 10 or other source of supply, to a heater 14 supplied with water through a spray head 16. The water is heated by direct contact with the heating gas to below its vapourisation temperature so that the heating gas leaves the top of the heater 14 with only a small amount of steam. The heated water leaves the heater 14 through a pipe 20 and is delivered by a pump 15 to a degassing chamber 33 through a spray head 33'. It passes through the chamber 33 countercurrent to a stream of air which enters at 34 and leaves at 35. It then passes to a flash chamber 36 through a spray head 37 which is preferably submerged as shown. The heater and degassing chamber 33 are maintained at atmospheric pressure, and the flash chamber 36 is maintained at sub-atmospheric pressure—for example, at about 70 mm. of mercury absolute pressure. The vapour which is flashed off through the outlet 38 from the flash chamber 36 is free from combustion products and is condensed in a condenser not shown.

If combustion products are used as the heating gas, carbon dioxide absorbed by the water in the heater 14 will be driven off by the air in the degassing chamber 33. Dissolved sulphur dioxide will be converted to sulphur trioxide forming dilute sulphuric acid which will not be flashed off in the flash chamber 36.

The residue in the flash chamber 36 is circulated by a pump 39 to the spray head 16 in the heater 14 which also receives fresh feed through a pipe 40. Brine is continuously removed through a blowdown 23 so as to maintain a suitable density in the system.

If the heating gas has no constituents which it is undesirable should be absorbed by the water, the degassing chamber 33 can be dispensed with or be by-passed as indicated by the broken line 41.

If the presence of carbon dioxide in the final condensate can be tolerated, the supply of air to the degassing chamber 33 can be dispensed with. In that case, the spray head 33' can be submerged in the liquid at the bottom of the degassing chamber 33 or the spray head 33' and the pump 15 can be dispensed with and the degassing chamber 33 provided with shelves, baffles or the like which cause the water coming from the heater 14 to be agitated or whirled as it descends in said degassing chamber. The air which is entrained in the water while it is in the heater 14 is sufficient to oxidise the sulphur dioxide to sulphur trioxide.

Figure 2 shows more completely a plant operating on the principle of that shown in Figure 1. As this plant is the preferred form of plant in accordance with the present invention, it will be described in some detail.

The heating gases are combustion products from an oil burner 101 in a combustion chamber 100. The water to be purified is heated in a heater 104 and is pumped by a pump 105 through a pipe 110 to a degasser 133 having an air inlet 134 and an air outlet 135. The degassed liquid is passed to a flash chamber 136 through a spray 137 and the resulting vapour passes off overhead to a condenser 107. The condensate, which is pure water, is removed by a pump 121.

Brine from the flash chamber 136 is circulated by a pump 138 to the heater 104 which also receives fresh feed water through a pipe 139, while brine is continuously removed through a blowdown 123.

Oil is burned by the burner 101 with sufficient excess air to give a mean gas temperature in the heater 104 of the order of 1000° C. The combustion air is supplied by a fan (not shown) through an air inlet 144 into an annular passage 145 surrounding the combustion chamber 100 and the duct 146 connecting it to the heater 104. The gas duct 146 is thus kept cool and the air passing therearound is preheated to about 150° C. The preheated air not required for combustion purposes is fed to the degasser 133 through a pipe 147.

The duct 146 projects into the heater 104 and the annular space around it is packed with Raschig rings 148. The water to be heated is sprayed partly downwards through the spray head 106 and partly upwards through a spray head 149. The upwardly sprayed water meets the hot gases passing down through the duct 146 and the downwardly sprayed water passes down through the Raschig rings 148 extracting further heat from the already cooled gases.

The water enters the heater at about 35° C. and is heated to about 70° C. The heating gas temperature is reduced from about 1000° C. to about 50° C.

The heated sea water is passed to the degasser 133 by the pump 105 and, as already explained, its carbon dioxide content is reduced or eliminated and sulphur compounds in it are converted to sulphuric acid. The degassed water then passes to the flash chamber 136 which is maintained at a sub-atmospheric pressure of about 70 mm. of mercury. Consequently, a proportion of the water is vapourised and passed through the outlet of flash chamber 136 to the condenser 107 in which it is condensed to provide the finally desired purified water. The salt originally in the raw sea water remains in the water in the flash chamber 136 as does any sulphuric acid formed as a result of the treatment in the degasser 135. The density and sulphuric acid content of the brine in the flash chamber 136 are maintained acceptably low by the continuous discharge through the blowdown 123. The brine which passes to waste has a temperature of about 35° C. and, therefore, only a very small heat loss is involved.

The distilled water obtained in the above manner from the condenser 107 is of excellent quality and is eminently suitable for use as boiler feed and as drinking water. I have found that when using for the production of the heating gas, furnace oil containing up to 2% sulphur or a distillate fuel oil containing up to 1% sulphur, distilled water can be produced having a pH value between 6 and 7 and a sulphite content not greater than 2 parts per million.

Good results can, of course, be obtained by the use of other heating gases as, for example, the combustion products of a gaseous hydrocarbon fuel, exhaust gases from internal combustion engines and gas turbines and so on. In the latter case, the plant obviously does not have to be provided with a combustion chamber. The heating gas temperature may have any value between a minimum required to give a reasonable temperature difference in the heater and a minimum dictated by the materials used in the construction of the plant. With a low gas temperature, the heater, for a given duty must be larger than if the gas temperature is high.

The design shown in Figure 2 has a number of important features.

The air cooling of the walls of the combustion chamber is of substantial practical importance not only in that heat is extracted from the gases which can be usefully used elsewhere but in it allows the combustion chamber and the gas duct 146 to be constructed of relatively low grade and therefore inexpensive materials in spite of the very high gas temperature.

The two-stage cooling of the heating gas which is effected by the provision of the two spray heads 106 and 149 is also an important feature. The bulk of the heat is removed from the gas by the water projected through the spray head 149 so that only a relatively small amount remains to be removed by the water which descends through the column of Raschig rings 148 from the spray head 106. Consequently, the column 148 does not have to be of great length or diameter. Various designs of heaters providing for two-stage cooling of the gas have been tried but that shown in Figure 2 in which the water is sprayed in parallel from two spray heads and the heating gas flows countercurrent to the two streams of water heating the two streams in succession has proved to give the greatest thermal efficiency. The two-stage cooling of the gas in two zones, one surrounding the other has, moreover, led to the most compact design.

The provision of a horizontal combustion chamber connected to the heater by a duct bent through a substantial angle is also a feature of some importance. The bend assists in ensuring mixing of the air and combustion products. A straight connection of the combustion chamber to the heater introduces a serious possibility of stratification of the gas and, consequently, uneven gas temperature at different points in the cross section of the heater at any particular level. The combustion chamber is set horizontally both as a matter of convenience and because it then lessens the danger of fuel which may have dripped from the burner being carried unburned into the heater. To lessen that danger still further, the duct 146 may be provided with a restriction or throat as indicated in dotted lines at 146'.

Having thus described my invention, I claim:

1. A heater for purifying sea or other "raw" water comprising a casing, a gas duct within said casing having an open lower end and extending downwardly into said casing from the upper portion of said casing to a point short of the bottom thereof, said casing surrounding said duct in space relation to form a passage therebetween, means for supplying a hot gas to the top of said duct to pass downwardly therethrough and out of said open lower end, a first spray head arranged to spray "raw" water upwardly into direct heat exchange contact with the hot gases issuing from the open lower end of said duct, and a second spray head positioned above the open lower end of said duct and in the passage surrounding said duct to spray "raw" water downwardly of said passage countercurrent to the direction of flow of the hot gas issuing from said open lower end of said duct and which has been cooled by direct heat exchange contact with the upwardly sprayed "raw" water issuing from said first spray head.

2. A heater as defined in claim 1 wherein the said surrounding passage is provided with a water and gas permeable mass to provide a large area of contact between the "raw" water issuing from said second spray head and flowing downwardly through said passage and the hot gas flowing upwardly through said passage.

3. In a heater as defined in claim 1, the combination of a degassing chamber receiving the heated "raw" water from said heater to flow downwardly through said degassing chamber, means to circulate air upwardly through said degassing chamber countercurrent to the downwardly flowing heated "raw" water therein, and a flash evaporation chamber receiving heated "raw" water from said degassing chamber.

4. A heater as defined in claim 1 wherein said means for supplying the hot gas to the duct comprises a furnace, fuel burners in said furnace, a hot gas outlet passage from said furnace, and means connecting said hot gas outlet passage to the top of said duct.

References Cited in the file of this patent
UNITED STATES PATENTS

| | | | |
|---|---|---|---|
| 236,940 | Faesch | Jan. 25, | 1881 |
| 314,559 | Baragawanth | Mar. 31, | 1885 |
| 1,493,579 | Walter | May 13, | 1924 |
| 1,493,756 | La Bour | May 13, | 1924 |
| 2,160,832 | Contant | June 6, | 1939 |
| 2,358,559 | Clemens | Sept. 19, | 1944 |

FOREIGN PATENTS

| | | | |
|---|---|---|---|
| 333,048 | Great Britain | Aug. 7, | 1930 |
| 369,376 | Great Britain | Mar. 24, | 1932 |